(12) United States Patent
Siegel et al.

(10) Patent No.: US 7,364,191 B2
(45) Date of Patent: Apr. 29, 2008

(54) GAS FLOW DISTRIBUTOR FOR A LATERAL AIRBAG MODULE

(75) Inventors: Wolfgang Siegel, Sontheim-Brenz (DE); Alexander Aulbach, Aschaffenburg (DE); Rainer Heuschmid, Neuburg (DE); Hans-Peter Sendelbach, Senden (DE); Christian Weyrich, Neu-Ulm (DE)

(73) Assignee: Takata-Petri (ULM) GmbH, Ulm (DE)

( * ) Notice: Subject to any disclaimer, the term of this patent is extended or adjusted under 35 U.S.C. 154(b) by 347 days.

(21) Appl. No.: 10/500,707

(22) PCT Filed: Dec. 23, 2002

(86) PCT No.: PCT/DE02/04762

§ 371 (c)(1),
(2), (4) Date: Sep. 24, 2004

(87) PCT Pub. No.: WO03/059690

PCT Pub. Date: Jul. 24, 2003

(65) Prior Publication Data
US 2005/0029784 A1 Feb. 10, 2005

(30) Foreign Application Priority Data
Jan. 4, 2002 (DE) .......................... 202 00 365 U
Nov. 15, 2002 (DE) .......................... 202 17 892 U

(51) Int. Cl.
*B60R 21/26* (2006.01)
(52) U.S. Cl. .................................... 280/736; 280/730.2
(58) Field of Classification Search ............. 280/730.2, 280/736, 740, 742
See application file for complete search history.

(56) References Cited

U.S. PATENT DOCUMENTS

| 5,172,933 | A | * | 12/1992 | Strasser ...................... 280/740 |
| 5,308,108 | A | | 5/1994 | Rion |
| 5,340,147 | A | | 8/1994 | Fontecchio et al. |
| 5,536,041 | A | | 7/1996 | Acker et al. |
| 5,540,460 | A | | 7/1996 | Wipasuramonton |
| 5,556,128 | A | * | 9/1996 | Sinnhuber et al. ....... 280/730.2 |
| 6,247,721 | B1 | * | 6/2001 | Lang ....................... 280/728.2 |
| 6,293,581 | B1 | * | 9/2001 | Saita et al. ............. 280/730.2 |
| 6,340,174 | B1 | * | 1/2002 | Takagi et al. ............... 280/736 |

(Continued)

FOREIGN PATENT DOCUMENTS

DE   94 08 908.6 U1   1/1995

(Continued)

OTHER PUBLICATIONS

Kenneth Mason "Deformable Diffuser for an air Bag Module", *Research Disclosure Nr. 391*, Hampshire, Great Britian, Nov. 1996, pp. 687-688.

*Primary Examiner*—Faye M. Fleming
(74) *Attorney, Agent, or Firm*—Foley & Lardner LLP

(57) ABSTRACT

The invention relates to a gas flow distributor for a lateral airbag module. The distributor is used to distribute a gas flow leaving a gas generator by the outflow openings thereof, in a targeted manner, in a gas bag which is to be inflated by the gas generator. According to an embodiment, the gas flow distributor is formed by a dimensionally stable receiving element surrounding outflow openings of the gas generator.

44 Claims, 7 Drawing Sheets

U.S. PATENT DOCUMENTS

| | | | |
|---|---|---|---|
| 6,419,266 B1 * | 7/2002 | Morfouace et al. | 280/740 |
| 6,467,805 B1 | 10/2002 | Schnowitz et al. | |
| 6,543,804 B2 | 4/2003 | Fischer | |
| 6,595,547 B2 * | 7/2003 | Smith | 280/736 |

FOREIGN PATENT DOCUMENTS

| | | |
|---|---|---|
| DE | 196 48 137 A1 | 5/1996 |
| DE | 196 16 858 A1 | 10/1996 |
| DE | 196 26 463 A1 | 1/1998 |
| DE | 299 21 743 U1 | 4/2000 |
| DE | 198 50 448 A1 | 5/2000 |
| EP | 0 790 154 A1 | 8/1997 |
| EP | 1 046 552 A1 | 10/2000 |
| WO | WO 99/42340 A1 | 8/1999 |
| WO | WO 00/69690 A1 | 11/2000 |

* cited by examiner

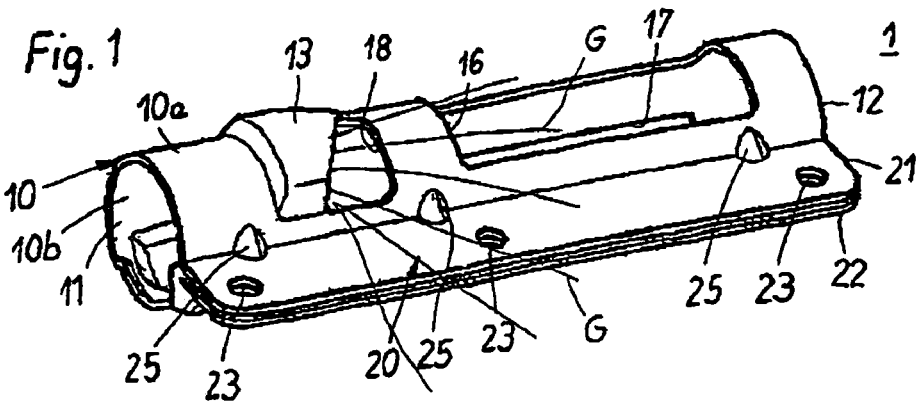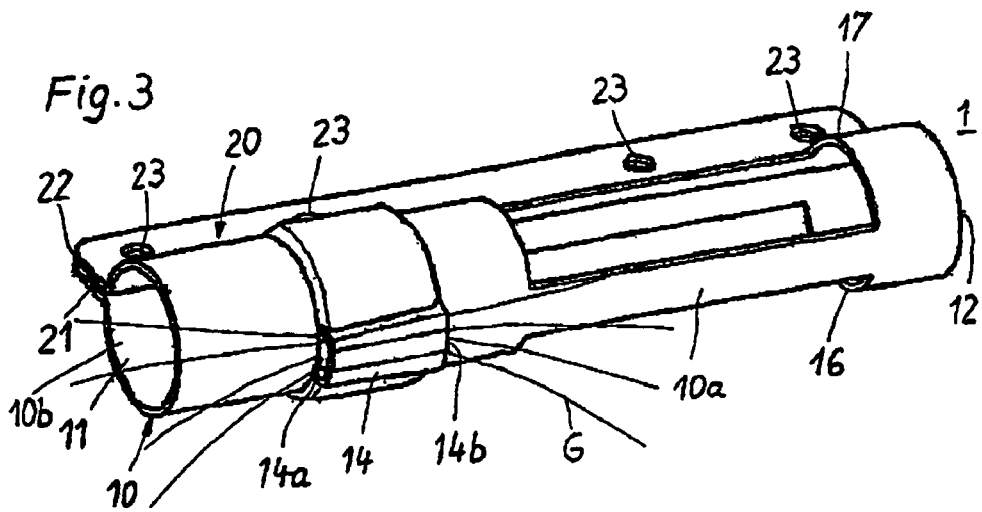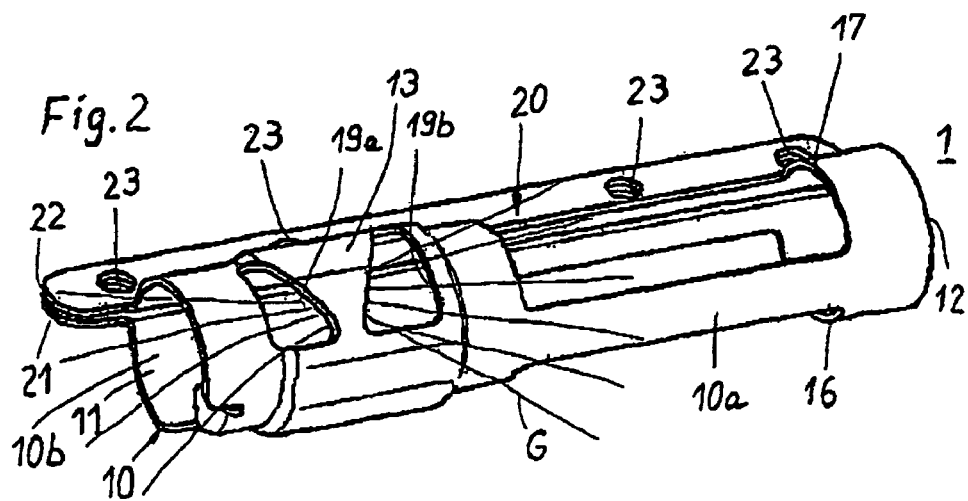

FIG 6
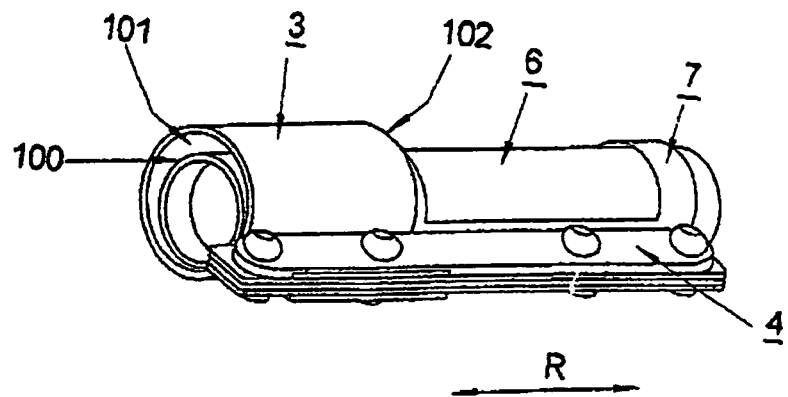
FIG 7
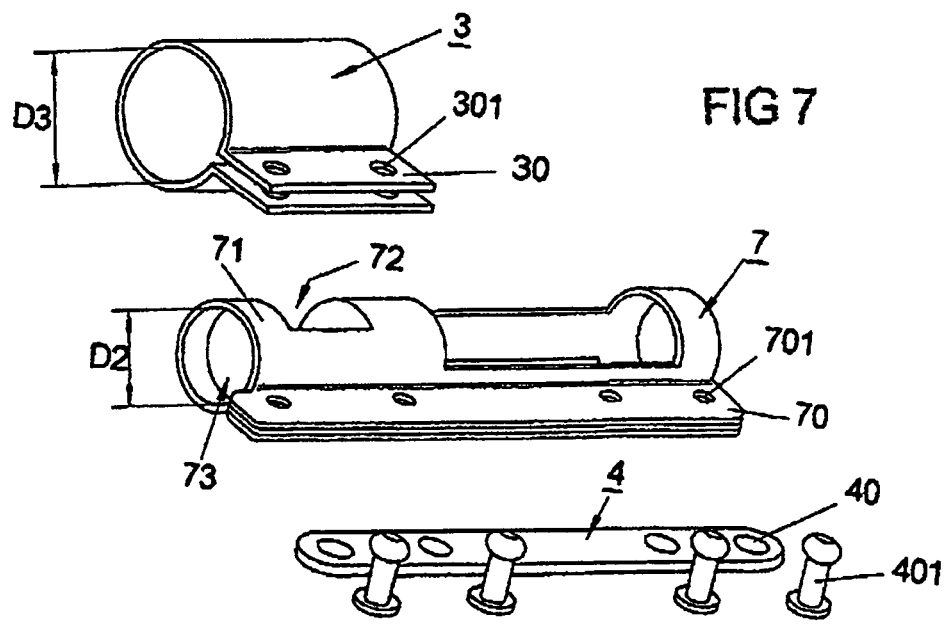
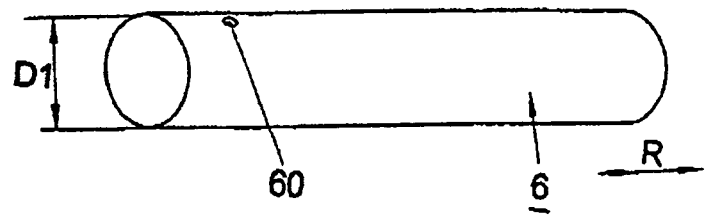

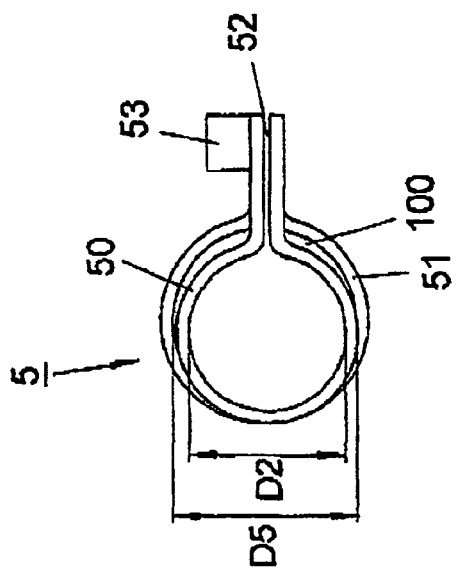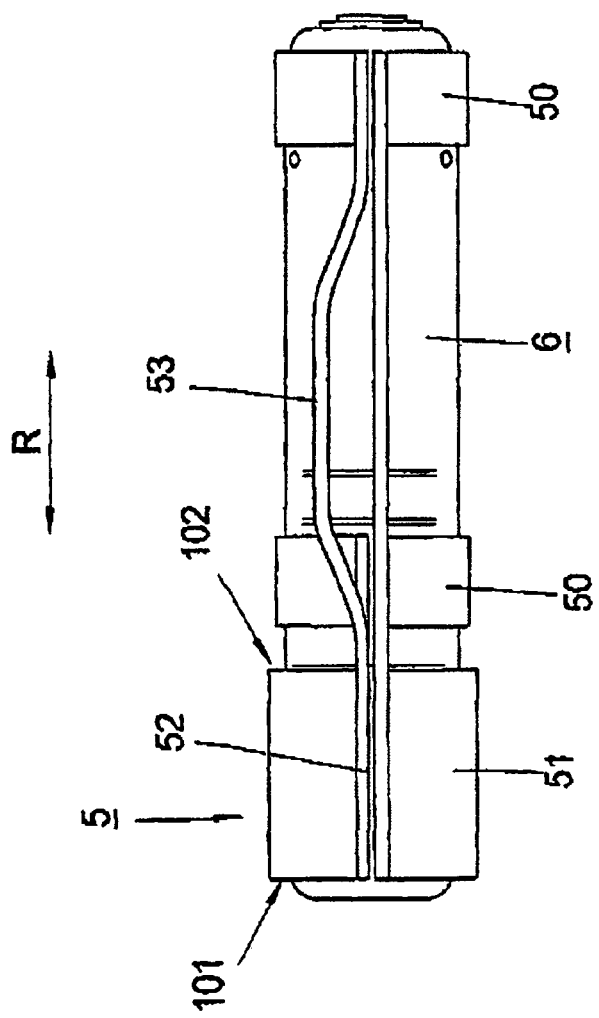

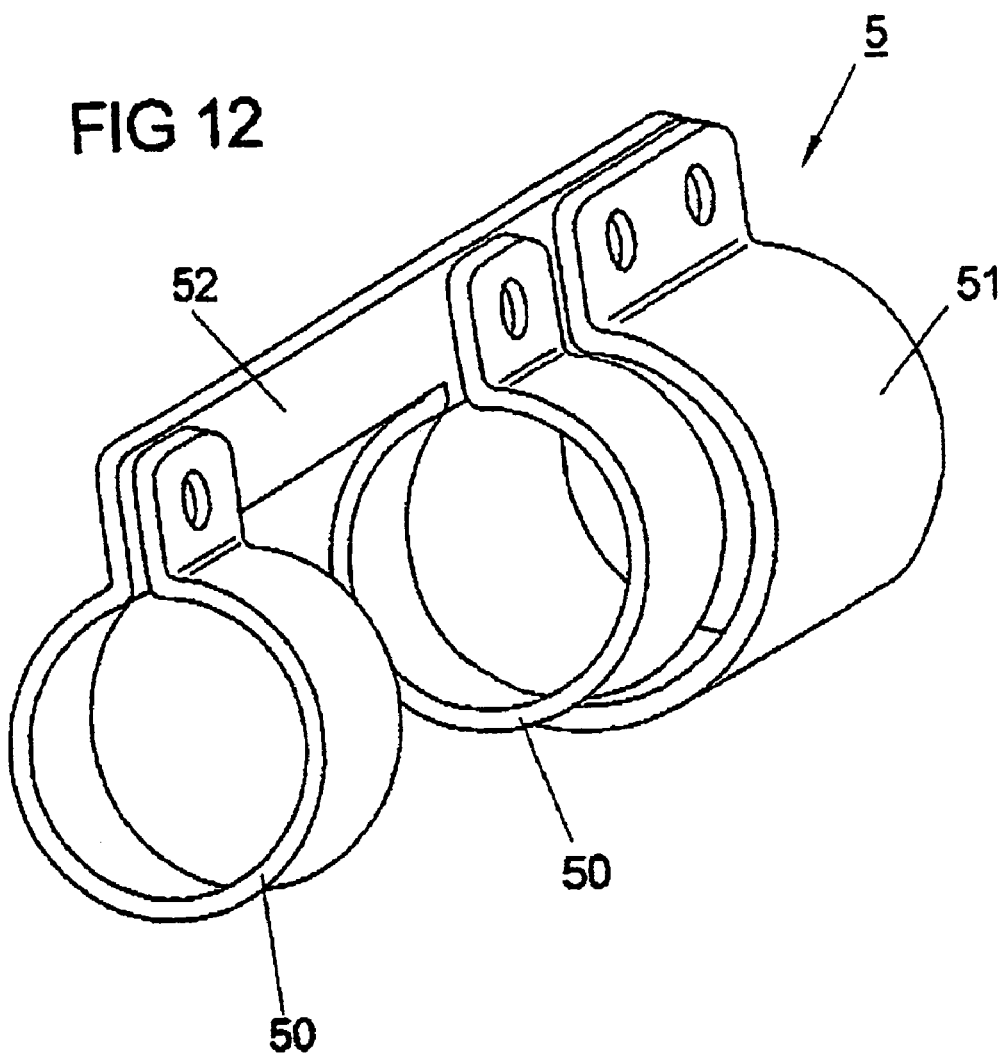

GAS FLOW DISTRIBUTOR FOR A LATERAL AIRBAG MODULE

BACKGROUND

The invention relates to a gas flow distributor for a lateral airbag module.

A lateral airbag module serves in the event of a crash to protect a vehicle occupant from colliding with lateral parts of the vehicle body, and is generally arranged in a vehicle door or laterally on a vehicle seat. In addition to a gas bag which can be inflated in the event of a crash to protect the particular vehicle occupant, the lateral airbag module comprises a gas generator for inflating the gas bag and a housing for holding the gas generator and gas bag. In order for an airbag module to be able to deploy the best possible restraining and therefore protective function for a vehicle occupant, a targeted, defined deployment of the gas bag during the inflation by means of the gas generator is of particular importance.

In lateral airbag modules, it is known to direct the gas flow within the gas bag by tucks or fabric flaps provided in or on the gas bag covering and to distribute it in a defined manner within the gas bag. In this case, the gas bag is divided by the tucks or fabric flaps into different regions which are intended to ensure a defined, predeterminable gas flow during the inflation of the gas bag.

SUMMARY OF THE INVENTION

The invention is based on the problem of providing a gas flow distributor of the type mentioned at the beginning, which contributes to a targeted, defined deployment and positioning of the gas bag to be inflated by the gas generator.

This problem is solved according to the invention by the provision of a gas flow distributor according the embodiments described herein.

According to them, the gas flow distributor is formed by a dimensionally stable holder surrounding the gas generator at least in the region of its outflow openings.

The solution according to the invention has the advantage that the gas flow distributor has an immediate, direct influence on the gas flow emerging from the gas generator, in order to achieve a defined deployment and positioning of the gas bag to be inflated. Thus, by suitable designing of that region of the gas flow distributor which holds the gas generator, the direction of deployment of the gas bag can be defined at an early point and durably in a predetermined manner. In this connection, the opening of the covering of the airbag module can also be positively influenced. Furthermore, by directing the gas flow, the inflation behavior of the gas bag in an oop situation (out-of-position situation), in which the occupant who is to be protected is outside his normal sitting position, can be influenced in such a manner that the risk of an occupant being injured is minimized.

Finally, a targeted distribution of the quantity of gas or of the gas flow enables the gas flowing out of the gas generator to be guided in a defined manner into the one or other chamber of a multi-chamber gas bag.

The above-described effects are achieved, in particular, by the fact that the gas emerging from the outflow openings of the gas generator is initially collected, immediately after it has emerged, in the holder formed by the gas flow distributor and then is guided on in a defined manner, along a predeterminable direction, into the interior of the gas bag to be inflated.

The gas flow distributor consists of such a dimensionally stable material, for example metal or a diecasting, that the holder formed by the gas flow distributor is not noticeably deformed by the gas flow emerging from the gas generator. Accordingly, in contrast with a gas flow distributor which is formed by tucks, fabric flaps, flexible tubing or the like provided in the gas bag covering, according to the present invention defined conditions, which cannot be adversely affected by the gas flow, are provided for the distribution of the gas flow. However, individual sections, for example in the form of a flap, may be provided on the holder of the gas flow distributor and can be moved in a targeted manner by the gas flow in order to release an outlet opening for the gas flow.

The holder of the gas flow distributor is designed in particular for the insertion of a tubular gas generator which, as part of a lateral airbag module, is to be arranged in a vehicle door or on a vehicle seat. For this purpose, the gas flow distributor has a holding region which surrounds the tubular gas generator and is of tubular design, for example is of polygonal or curved design in cross section. In one preferred embodiment, the holder of the gas flow distributor is designed to let a gas flow into a gas bag to be inflated, essentially along the circumferential surface of the holder, for example in the axial direction. In such a case, the gas flow which usually emerges vertically from a gas generator does not therefore pass simply along this direction into the gas bag, but rather is deflected beforehand, namely in a direction along the circumferential surface of the gas flow distributor which surrounds the gas generator at least in the region of its outflow openings.

In order to let the gas flow in a defined manner into the gas bag to be inflated, the holder forming the gas flow distributor has at least one outlet opening through which gas which has flowed into the interior of the holder can emerge from the gas generator and can flow into the gas bag to be inflated. In the case of a gas flow distributor having a tubular holding region, outlet openings of this type can be provided, in particular, in the casing of the holding region.

In one development of the invention, the size of the outlet openings can be set in order to match them to different circumstances.

Furthermore, the at least one outlet opening of the gas flow distributor can be at least partially closed by a covering which is opened by the gas flow emerging from the gas generator, and, as a result, the gas can flow into the gas bag to be inflated. In this case, the outlet openings are preferably arranged and designed to conduct the gas flow emerging from a tubular gas generator in the axial direction, i.e. along the direction of extent of the gas generator. In the opened state, the covering can serve at the same time as a directing element with which gas flowing through the outlet opening of the gas flow distributor is predetermined a direction of flow when flowing into the gas bag to be inflated.

The gas flow distributor is preferably designed in such a manner, i.e. is matched in such a manner to the outer shape, size and outflow openings of the gas generator, that the gas flowing out of the gas generator is at least in part initially reflected against a wall of the holding region before it emerges from the gas flow distributor. This prevents the hot gases flowing out of the gas generator from coming directly into contact with the fabric or the seams of the gas bag to be inflated or with other heat-sensitive parts. Instead, first of all the gas within the holding region of the gas flow distributor is cooled before the gas flows on into the gas bag to be inflated. In addition, the velocity of the gas flow is also retarded. This enables less exacting requirements to be made of the coating of the gas bag covering. Furthermore, the influencing of the gas flow by the walls of the holding region of the gas flow distributor can also serve for directing the gas flow per se, in particular in order to permit the gas flow to be deflected in the axial direction, along the direction of extent of a tubular gas generator, when it passes through the outlet openings of the gas flow distributor.

The gas pressure within the holding region can be influenced by varying the volume available for the gas within the holding region of the generator support, i.e. as a function of the distance of the outer wall of the gas generator from the inner wall of the holding region of the gas flow distributor. This in turn has an effect on the distribution of the quantity of gas via the corresponding outlet openings of the holding region. The size of the outlet openings of the holding region (outlet area of the openings) determines, inter alia, the inflation velocity of the airbag and the distribution of the quantity of gas within various airbag regions, which is of importance in particular in the case of multi-chamber systems in which different internal pressures are to be produced in different chambers.

In addition, the velocity of the program of deployment of the airbag can also be influenced by the shape of the holding region (hollow-cylindrical or different tube shape).

In one development of the invention, the gas flow distributor can serve at the same time as the generator support which holds the gas generator and is connected via a connecting region to a supporting part of a motor vehicle, in particular a supporting part of a vehicle door or of a vehicle seat.

The connecting region of the generator support, which is arranged and designed to provide an indirect or direct connection to a supporting part of a motor vehicle, can be configured, for example as a flange which protrudes from the holding region of the generator support. In one preferred embodiment, the generator support is of single-piece design, i.e. the connecting region of the generator support is integrally formed as a single piece on the holding region thereof.

It is advantageous to design at least one region of the holder as an impact element, so that at least one gas-guiding duct for guiding the gas flow runs between the impact element and the gas generator. This has the advantage that the gas flow distributor immediately and directly influences the gas flow emerging from the gas generator and, by means of the design of the gas-guiding duct, the gas flowing out can be guided in a defined manner into a certain region of the gas bag to be inflated. The guiding of the gas flow enables the inflation behavior of the gas bag to be influenced in such a manner, even in an oop situation, in which the occupant to be protected is outside his normal sitting position, that the risk of an injury to the motor vehicle occupant by the deploying gas bag is reduced. Furthermore, the targeted distribution of the quantity of gas or of the gas flow of the gas flowing out of the gas generator enables the gas to be guided in a defined manner into one or more chambers of a multi-chamber gas bag or into a plurality of gas bags. In this case, the gas flow distributor according to the invention can also serve for attaching a plurality of gas bags to a gas generator.

The gas-guiding duct can be formed here either between the outside of the gas generator and the inside of the holder, which is designed as an impact element, or else between the outside of a region of the holder that surrounds the gas generator and the inside of the impact element.

In one preferred embodiment of the invention, the impact element has an essentially circular cross section and is fitted in such a manner that the gas-guiding duct essentially has a circular ring-shaped or a crescent-shaped cross section. Appropriate dimensioning of the gas-guiding duct thus enables, owing to a small flow cross section, very high gas outflow velocities and therefore a very high impulse transmission to be transmitted to the gas bag covering to be deployed.

The impact element is advantageously designed in such a manner that, even during plastic deformation, as may occur, for example, during the installation process or during operation of the gas generator, the function of the impact element is maintained. Thus, for example, even local or temporal high-pressure maxima of the gas flow can be compensated for without the functioning of the gas flow distributor being adversely affected.

The gas outlet regions of the gas-guiding ducts advantageously lead into at least one gas bag or into different gas bag chambers. When a plurality of gas bag chambers or a plurality of gas bags are used, the impact element may serve to separate two gas bag chambers from each other or may serve as a single connection between two gas bags. In this case, a separating gap running between two gas bags may run in the region of the impact element, so that communication between the gas bags is possible only via the gas-guiding duct. Furthermore, it is advantageous to brace the separating gap in a gastight manner via the impact element.

A lateral airbag module having a gas generator for inflating a gas bag and a gas flow distributor designed in accordance with the invention is characterized by the features of claim 39.

In one preferred embodiment of this airbag module, the holding region of the gas flow distributor is arranged within the gas bag to be inflated. This permits a particularly compact construction of the airbag module.

BRIEF DESCRIPTION OF THE DRAWINGS

Further features and advantages of the invention will become clear in the following description of an exemplary embodiment with reference to the figures, in which:

FIG. 1 shows a perspective illustration of a gas flow distributor for holding a gas generator;

FIG. 2 shows a perspective rear view of the gas flow distributor from FIG. 1;

FIG. 3 shows a first modification of the exemplary embodiment from FIGS. 1 and 2;

FIG. 6 shows a perspective illustration of a further embodiment of a gas flow distributor according to the invention;

FIG. 7 shows an exploded drawing of the gas flow distributor from FIG. 6;

FIG. 10 shows a lateral view of the gas flow distributor from FIGS. 8 and 9;

FIG. 11 shows a cross section through the gas flow distributor from FIGS. 8, 9 and 10;

FIG. 12 shows a perspective illustration of a further embodiment of a gas flow distributor according to the invention;

DETAILED DESCRIPTION

Figure 4:
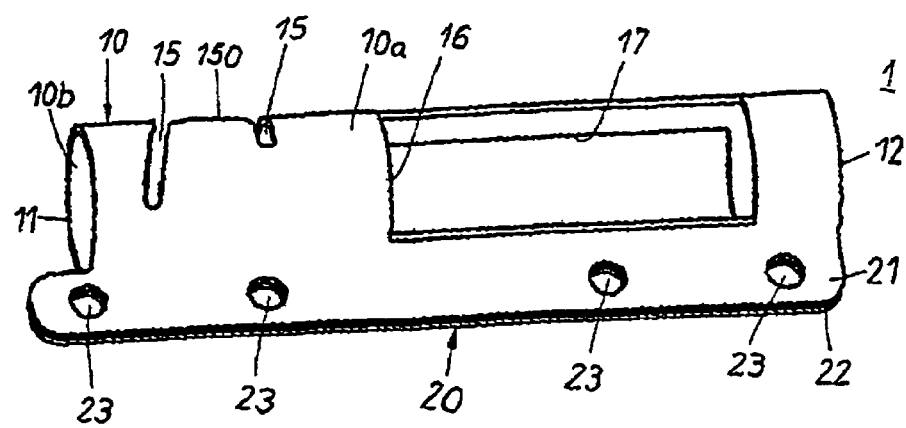
FIG. 4 shows a second modification of the exemplary embodiment from FIGS. 1 and 2.

FIG. 1 is a perspective illustration of a gas flow distributor in the form of a generator support 1 for holding a gas generator. The generator support 1 forms part of a lateral airbag module and can support a gas generator with which a gas bag can be inflated in a sensor-controlled manner to protect a vehicle occupant in the event of a crash. The gas bag and the gas generator are usually arranged in a module housing which has a covering which opens during the inflation of the gas bag, so that the gas bag can be deployed in the direction of the vehicle occupant to be protected.

The gas generator is connected via the generator support 1 either to a supporting part of the airbag module, for example the housing of the airbag module, or directly to a supporting part of the vehicle body, for example a door panel or a seat frame in the case of a lateral airbag. By this means, the gas generator is coupled via the generator support to a supporting vehicle part.

According to FIG. 1, the holding region 10 of the generator support 1 is of tubular, in particular hollow-cylindrical, configuration, so that a tubular gas generator arranged within the holding region 10 is surrounded by the holding region 10. The holding region 10 forms in cross section a slotted ring with a plate 21 and 22 protruding radially in each case from its ends placed on both sides of the slot.

The hollow-cylindrical holding region 10 has two open cover surfaces 11, 12 on its end sides, the cover surfaces permitting the introduction of a gas generator into the holding region 10 by said slot expanding, and two large recesses 16, 17 in its casing surface, the recesses serving to reduce the weight of the generator support 1. Next to the one large recess 16, an outlet opening 18 is additionally provided in the casing surface, said outlet opening being partially covered by an elevation 13 of the casing surface, which forms the outer wall 10a of the holding region, and said outlet opening being situated above the outflow openings of the gas generator leading into the generator support 1, when the gas generator is introduced. The elevation 13 serves as guiding element with which the direction of the gas flow emerging from the outlet opening 18 can be influenced.

Gases which have flowed from a gas generator into the interior of the holding region 10 can pass on through the last-mentioned outlet opening 18 into the gas bag to be inflated. For this purpose, the holding region 10 of the generator support 1 is preferably arranged together with the gas generator arranged in it within the gas bag, which is to be inflated, of the airbag module.

The arrangement, shape and size of the outlet opening 18 of the holding region 10, through which gas flowing from a gas generator can pass into the gas bag to be inflated, and the elevation 13 determine the direction and velocity at which the gas enters into the gas bag.

In the present case, the gas flow G flowing through the outlet opening 18 is directed by means of the elevation 13 along the casing surface of the receiving region 10, in particular in the axial direction.

As becomes clear with reference to the rear view according to FIG. 2, two further outlet openings 19a, 19b are provided lying radially opposite each other on both sides of an elevation 13 in the casing of the holding region 10 and the above outlet opening 18, with it being possible for a gas flow G to emerge through them along the surface of the outer wall 10a of the holding region 10, specifically, in particular, in the axial direction of the longitudinally extended generator support 1.

The gas generator to be held in the holding region 10 of the generator support 1 can be arranged there in particular in such a manner that gas flowing out of the outflow openings of this gas generator is directed toward the inner wall 10b of the holding region 10. In this case, the outflow openings of the gas generator are preferably situated in the region of that section of the holding region 10 of the gas generator support 1 which is provided with the outlet openings 18, 19a, 19b. The gas flowing from the gas generator into the interior of the generator support 1 is initially reflected against the inner wall 10b of the holding region 10 before it passes through the openings 18, 19a, 19b, provided for this purpose, in the holding region 10 into the gas bag to be inflated. As a result, the gas flow is somewhat cooled and slowed down before it impacts against any heat-sensitive parts of the gas bag, for example the gas bag covering or seams. The risk of damage to the gas bag by hot gases can thereby be considerably reduced.

A connecting region 20 having fastening openings 23 is integrally formed as a single piece on the holding region 10 of the generator support 1 and can be used to connect the generator support to a supporting part of the airbag module or a motor vehicle body. The connecting region 20 is designed as a flange and comprises two plates 21, 22 which bear against each other and are integrally formed as a single piece on the holding region 10. For this purpose, the holding region 10 forms in cross section a slotted ring with one of the plates 21, 22 integrally formed on each of its two ends. In order to stabilize the connecting region 20, stiffening elements 25 via which the connecting region 20 is additionally connected to the holding region 10 are additionally provided.

The exemplary embodiment of a generator support that is illustrated in FIG. 3 differs from the one illustrated in FIGS. 1 and 2 merely in respect of the design of two outlet openings which are provided in the wall of the holding region 10. Otherwise, the two exemplary embodiments correspond, and so reference is made in this regard to the details for FIG. 1. Components of the generator support which correspond are provided with identical reference numbers in the two figures.

According to FIG. 3, two outlet opening 14a, 14b placed next to the two large recesses 16, 17 are formed by the two open end sides of a duct 14 which is integrally formed as an elevation on the outer wall 10a of the holding region 10. The gases G emerging through the open end sides 14a, 14b flow first of all parallel to the outer wall 10a of the holding region 10, predominantly in the axial direction of the generator support 1, and then pass into the gas bag to be inflated.

The generator support 1 is installed in a vehicle in such a manner that its longitudinal axis extends essentially along the vertical vehicle axis. The gas flow emerging from the gas flow distributor in the form of a generator support is therefore directed upward or downward essentially in the vertical direction through the respective outlet openings 14a, 14b, 18, 19a, 19b.

Figure 5:
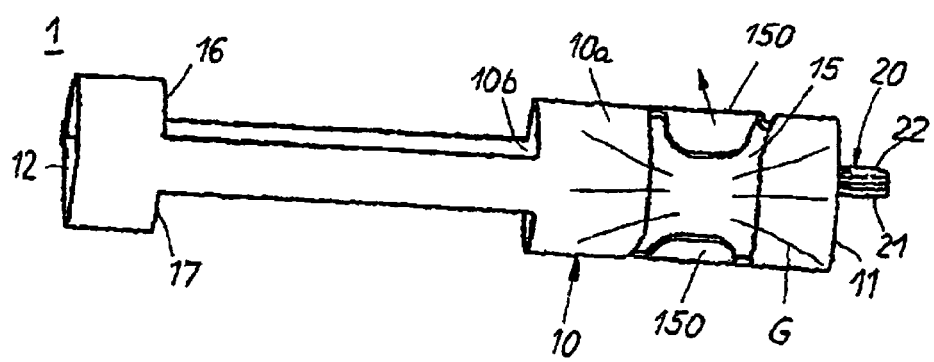
FIG. 5 shows a rear view of the gas flow distributor from FIG. 4.

FIGS. 4 and 5 illustrate a further modification of the exemplary embodiment from FIGS. 1 and 2, the difference residing exclusively in the design of the outlet openings through which gas which has flowed into the gas flow distributor (generator support 1) from a gas generator can flow on into a gas bag to be inflated.

According to FIGS. 4 and 5, an outlet opening 15 is arranged next to the large recesses 16, 17 in the holding region 10 of the generator support 1, said outlet opening being partially closed by a covering in the form of tabs 150. In this case, the recess 15 extends with slot-shaped runners along the lateral edges of the tabs 150, so that the latter are connected only in an end section to the casing surface of the tubular holding region 10.

In this case, the gas which emerges from the gas generator after the airbag module is triggered and flows, in particular, toward the inner wall 10a of the holding region 10 raises the tabs 150 which partially cover the outlet opening 15, as indicated in FIG. 5 with reference to the double arrow, so that the tabs 150 protrude obliquely from the casing surface of the tubular holding region 10. This firstly enables the cross-sectional area of the outlet opening 15 through which the gas which has emerged from the gas generator can flow into the gas bag to be inflated to be enlarged. At the same time, after bending over outward, the tabs 150 form guiding elements which contribute to guiding the gas flow G, when it flows through the outlet opening 15, along the casing surface of the tubular holding region 10 of the generator support 1. In particular, the tabs 150 in this state counteract a radial and tangential outflow of the gases, so that the gas flow G has, above all, a component in the axial direction of the tubular holding region 10.

The direction of flow of the gas passing through the outlet opening 15 can be influenced by varying the geometry of the outlet opening 15 and of the tabs 150 and by the specification associated therewith of the direction along which the tabs 150 are bent over outward by the pressure of the gas flow.

FIGS. 6 and 7 show a further embodiment of a gas flow distributor according to the invention. The gas flow distributor has a holder in the form of an impact element 3 which surrounds a tubular gas generator 6 in the region of the gas outflow openings 60 of the tubular gas generator 6. In this case, the impact element 3 is in the form of a hose-clip-shaped holder which surrounds the tubular gas generator 6 largely without any contact. As a result, a gas-guiding duct 100 for guiding the gas flow emerging from the gas outflow openings 60 of the tubular gas generator 6 is formed between the hose-clip-shaped impact element 3 and the tubular gas generator 6.

The tubular gas generator 6 is held in a fastening device 7, which is likewise hose-clip-shaped, and can be fastened via said fastening device to a motor vehicle structure (not illustrated here). For fastening purposes, the tubular gas generator 6 is held here in a cylindrical recess 73 in the hose-clip-shaped fastening element 7. In the region of the gas outlet openings 60 of the tubular gas generator 6, the fastening element 7 has a cutout region 72, so that the gas flowing from the gas outflow openings 60 is not obstructed by the hose-clip-shaped fastening element 7 from flowing out.

In addition, the fastening element 7 has a fastening region 70 which serves to attach the tubular gas generator 6 together with the impact element 3 to a motor vehicle structure via joining elements in the form of rivets and/or screws 401 which are guided in holes 701, 40. At the fastening region 70, an airbag can be placed between the fastening region 70 and a clamping rail 4 in such a manner that the gas-guiding device is surrounded by the airbag fabric. Tightening of the joining elements 401 causes the airbag to be tightened around the impact element and sealed or connected fixedly to the gas-guiding device and/or to a means of attaching it to the vehicle structure.

The impact element 3 likewise has a fastening section 30 into which rivet-shaped fastening means 401 can be guided, likewise through holes 301, and result in the hose-clip-shaped impact element 3 being fastened to the hose-clip-shaped fastening element 7.

A crescent-shaped gas-guiding duct 100 is formed between the gas generator 1 and the hose-clip-shaped impact element 3. In this case, the gas flowing from the gas outflow opening 60 of the tubular gas generator 6 impacts initially against the hose-clip-shaped impact element 3 and is then guided in the gas-guiding duct 100 in the direction of two opposite gas outflow regions 101, 102. In the embodiment illustrated here, the gas flows emerging from the two gas outlet regions 101, 102 emerge in directions essentially opposed to each other and along the tube axis R of the tubular gas generator. In this case, the gas-guiding duct 100 has a flow cross section which arises from the outside diameter D2 of the hose-clip-shaped fastening element 7 and the inside diameter D3 of the hose-clip-shaped impact element 3.

FIGS. 8 to 11 show a further embodiment of the gas-guiding device according to the invention. The gas-guiding device has a holder in the form of an impact element 5 which can be arranged on a gas generator 6.

Figure 8:
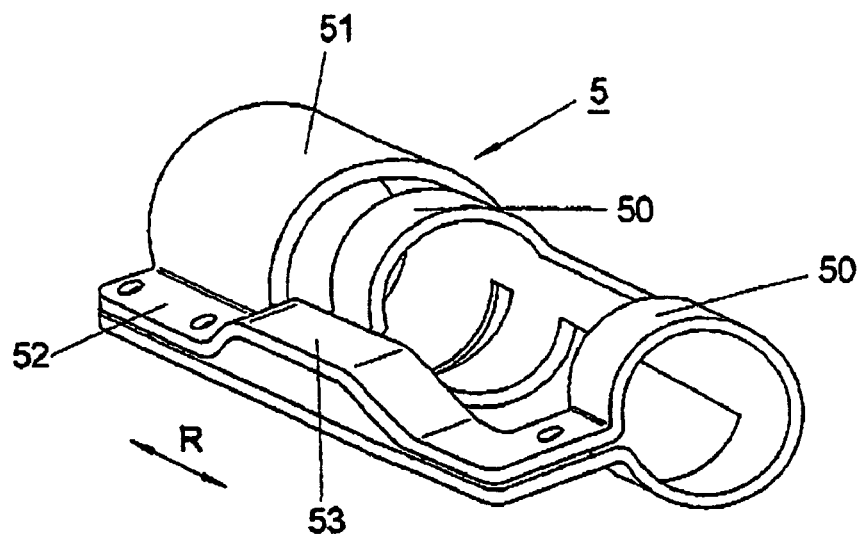
FIG. 8 shows a perspective illustration of a further embodiment of a gas flow distributor according to the invention.
Figure 9:
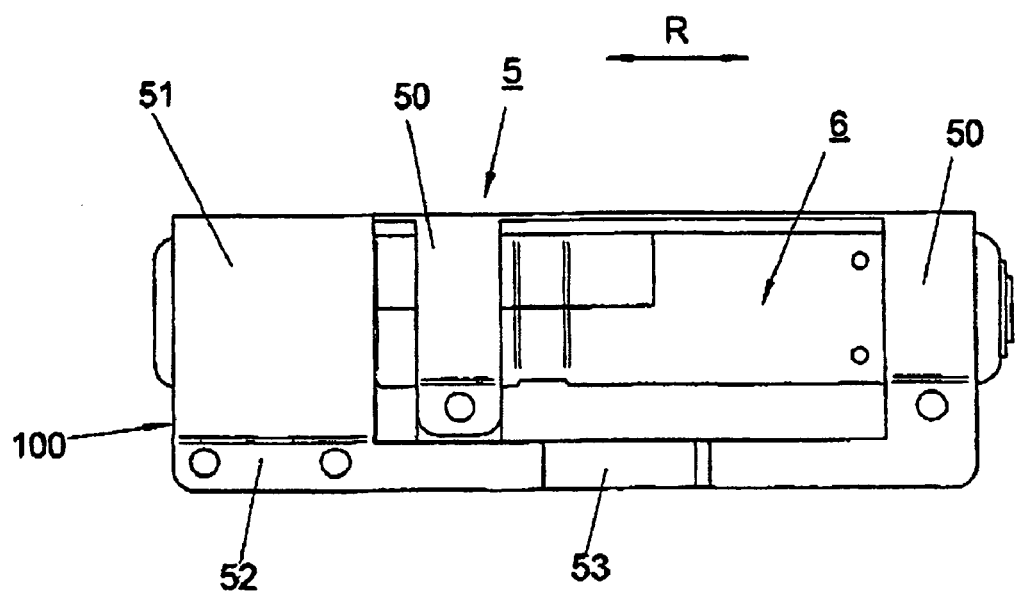
FIG. 9 shows a plan view of the gas flow distributor from FIG. 8.

The embodiment shown here integrates the impact element, which is realized separately in the embodiment of FIGS. 8 and 9, with a fastening element for the gas generator. The gas generator, which is designed as a tubular gas generator 6, is surrounded by hose-clip-shaped regions 50 of the impact element 5. The hose-clip-shaped regions 50 are situated in a region of the tubular gas generator 6 in which no gas outflow openings are provided. A further hose-clip-shaped region 51 of the impact element 5 is provided in the region of the gas outflow openings of the gas generator 6 and has a larger diameter D5 than the hose-clip regions 50 securing the tubular gas generator 6. This in turn forms, between the hose-clip-shaped region 51 of the impact element 5 and the tubular gas generator 6, a gas-guiding duct 100 which leads into two mutually opposite gas outlet regions 101, 102.

Since the two hose-clip-shaped regions 50, which secure the tubular gas generator 6, and also the hose-clip-shaped region 51 guiding the gas flow are formed as a single piece from a single metal sheet, they have a common "back" which lies opposite a fastening region 52 for attaching the gas-guiding device to a vehicle structure. The gas-guiding duct 100 therefore has a crescent-shaped cross section which arises from the eccentric position of the tubular gas generator 6.

In the embodiment shown, the impact element 5 furthermore has a clamp 53 which keeps a gas bag opening arranged in this region open, so that a gas flow can flow unobstructed into the gas bag.

Figure 13:
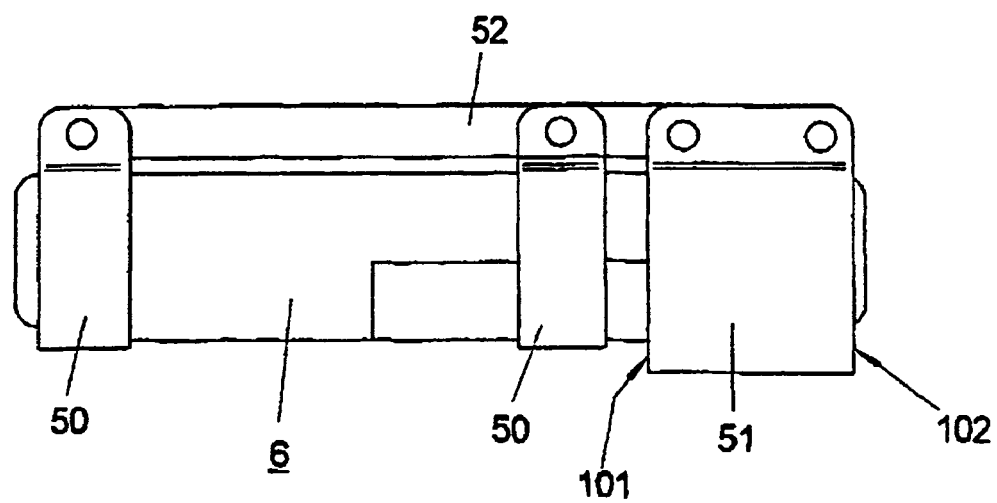
FIG. 13 shows a lateral view of the gas flow distributor from FIG. 12 with the gas generator inserted.
Figure 14:
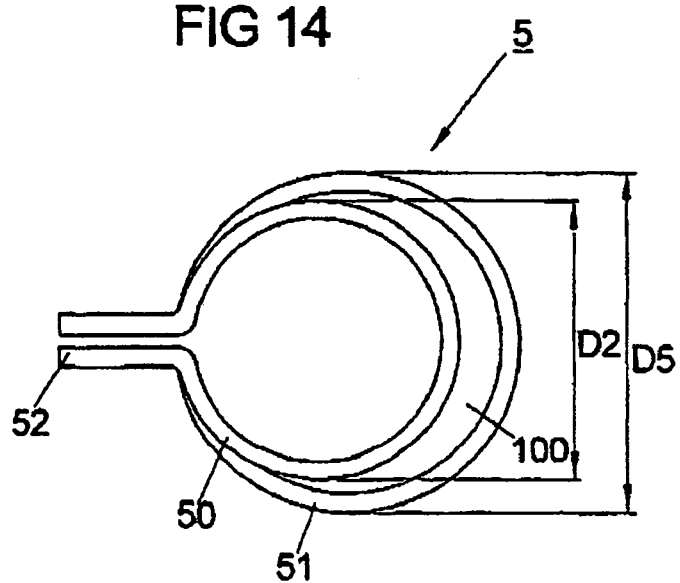
FIG. 14 shows a cross section through the gas flow distributor from FIGS. 12 and 13.

FIGS. 12 to 14 show a further embodiment of a gas-guiding device according to the invention, it being possible for the gas-guiding device to have in turn a holder in the form of an impact element 5 which can be arranged on a gas generator 6.

The tubular gas generator 6 is surrounded and held by hose-clip-shaped regions 50 of the impact element 5. In contrast with the embodiment shown in FIGS. 8 to 11, the impact element 5 here is configured in such a manner that the fastening region 52 is situated on that side of the impact element 5 which is opposite the gas-guiding duct 100. The gas outflow openings 101, 102 are thereby likewise situated on that side of the gas-guiding device which is opposite the fastening region. The individual hose-clip-shaped regions 50, 51 completely surround the gas generator 6.

In one embodiment (not illustrated here) two gas bags adjoin the impact element 3, 5 in such a manner that in each case at least one gas-guiding duct 100 leads into each gas bag. In this case, the impact element 3, 5 may also be arranged in the region of a separating gap between the two gas bags. The gas-guiding ducts formed by the impact element enable the two gas bags thus to be inflated uniformly or in a predetermined manner using a single gas generator.

The invention claimed is:

1. A gas flow distributor for a lateral airbag module, comprising:
    a holder configured to surround outflow openings of a gas generator,
    wherein the holder includes an impact element and a gas-guiding duct,
    wherein the gas-guiding duct is configured to guide gas flowing between the impact element and the gas generator,
    wherein the impact element is configured so that a gas flow emerging from the outflow openings of the gas generator impacts against the impact element and is thereby deflected and divided into a first gas flow and a second gas flow,
    wherein the first gas flow is deflected in a first direction along a circumferential surface of the gas flow distributor toward a first gas outlet region and the second gas flow is deflected in a second direction along the circumferential surface of the gas flow distributor toward a second gas outlet region,
    wherein the first and second gas flows emerge from the gas outlet regions along a tube axis of the gas generator,
    wherein the first and second gas outlet regions are opposite one another,
    wherein the gas generator comprises a tubular gas generator and the tube axis of the gas generator and a cross-sectional axis of the impact element are spaced apart from each other,
    wherein the first and second gas outlet regions are the sole gas outlet regions.

2. The gas flow distributor of claim 1, wherein the gas-guiding duct runs essentially between an outside of the gas generator and an inside of the impact element.

3. The gas flow distributor of claim 2, wherein the gas-guiding duct runs essentially between an outside of a region of the holder that surrounds the gas generator and an inside of the impact element.

4. The gas flow distributor of claim 1, wherein the impact element has an essentially circular cross section.

5. The gas flow distributor of claim 1, wherein the impact element is formed as a single piece with an end portion of the holder.

6. The gas flow distributor of claim 1, wherein the gas-guiding duct essentially has one of a circular ring-shaped cross section or a crescent-shaped cross section.

7. The gas flow distributor of claim 1, wherein the gas outlet regions of the gas-guiding duct or outlet openings of the holder lead into at least one gas bag.

8. The gas flow distributor of claim 7, wherein the gas outlet regions of the gas-guiding duct lead into different chambers of the gas bag or into different gas bags.

9. The gas flow distributor of claim 1, wherein one of the impact element or the holder serve to separate two gas bag chambers.

10. The gas flow distributor of claim 1, wherein at least two gas bags are attached to one of the impact element or the holder and in each case at least one gas-guiding duct or at least one outlet opening leads into one gas bag in each case.

11. The gas flow distributor of claim 1, wherein the holder comprises a dimensionally stable material so that the holder is not deformed by the gas flow emerging from the gas generator.

12. The gas flow distributor of claim 11, wherein the holder comprises metal or a die casting.

13. The gas flow distributor of claim 12, where the holder is configured to hold a tubular gas generator.

14. The gas flow distributor of claim 13, wherein the holder includes a holding region for surrounding the tubular gas generator.

15. The gas flow distributor of claim 14, wherein the holding region comprises a tubular shape.

16. The gas flow distributor of claim 15, wherein a cross section of the holding region comprises a continuous curve.

17. The gas flow distributor of claim 16, wherein the continuous curve comprises a circular shape or a polygonal shape.

18. The gas flow distributor of claim 15, wherein the holding region comprises an essentially hollow, cylindrical shape.

19. The gas flow distributor of claim 14, where the holder is configured to allow gas flowing along a circumferential surface of the holding region in a direction of extent of the tubular gas generator into a gas bag.

20. The gas flow distributor of claim 1, wherein the holder includes holder outlet openings through which gas which has flowed into an interior of the holder can emerge from the gas generator and can flow into a gas bag to thereby inflate the gas bag.

21. The gas flow distributor of claim 20, wherein at least one holder outlet opening is provided in a casing of the holding region.

22. The gas flow distributor of claim 20, wherein a size of the holder outlet openings can be set.

23. The gas flow distributor of claim 20, wherein the holder outlet opening is at least partially closed by a covering which is opened by the gas flow emerging from the gas generator.

24. The gas flow distributor of claim 20, wherein at least one holder outlet opening is configured to conduct the gas flow emerging from the gas generator along a circumferential surface of the holding region in a direction of extent of the gas generator.

25. The gas flow distributor of claim 14, wherein the holder is configured so that the gas flow emerging from the gas generator is held in the holding region and is at least in part initially reflected against an inner wall of the holding region before the gas flow emerges from the holder.

26. The gas flow distributor of claim 14, wherein an inner wall of the holding region is spaced apart from the gas generator at least in a region of the gas generator outflow openings.

27. The gas flow distributor of claim 1, wherein the holder is configured to be connected directly to a supporting part of a motor vehicle.

28. The gas flow distributor of claim 1, wherein the holder is configured to be connected to a supporting part of a motor vehicle indirectly via a further assembly.

29. The gas flow distributor of claim 28, wherein the further assembly comprises a subassembly of an airbag module.

30. The gas flow distributor of claim 1, wherein the gas flow distributor is configured to serve as a generator support and includes a connecting region for connecting the generator support to a supporting part of a motor vehicle.

31. The gas flow distributor of claim 30, wherein the connecting region includes fastening points for fastening the generator support to a further subassembly.

32. The gas flow distributor of claim 31, where the connecting region includes a flange.

33. The gas flow distributor of claim 32, wherein the flange protrudes from a holding region of the generator support.

34. The gas flow distributor of claim 33, wherein the holding region and the connecting region of the generator support comprise a single-piece design.

35. The gas flow distributor of claim 10, wherein a separating gap running between two gas bags runs in a region of one of the impact element or the holder.

36. The gas flow distributor of claim 35, wherein the separating gap is configured to be braced in a gastight manner via the impact element.

37. The gas flow distributor of claim 1, wherein a function of the impact element or of the holder is maintained during plastic deformation.

38. The gas flow distributor of claim 1, wherein the gas flow distributor is included in a lateral airbag module.

39. A lateral airbag module, comprising:
a gas generator;
a gas flow distributor including a holder configured to surround outflow openings of the gas generator,
wherein the holder includes an impact element and a gas-guiding duct,
wherein the gas-guiding duct is configured to guide gas flowing between the impact element and the gas generator,
wherein the impact element is configured so that a gas flow emerging from the outflow openings of the gas generator impacts against the impact element and is thereby deflected and divided into a first gas flow and a second gas flow,
wherein the first gas flow is deflected in a first direction along a circumferential surface of the gas flow distributor toward a first gas outlet region and the second gas flow is deflected in a second direction along the circumferential surface of the gas flow distributor toward a second gas outlet region,
wherein the first and second gas flows emerge from the gas outlet regions along a tube axis of the gas generator,
wherein the first and second gas outlet regions are opposite one another,
wherein the gas generator comprises a tubular gas generator and the tube axis of the gas generator and a cross-sectional axis of the impact element are spaced apart from each other,
wherein the first and second gas outlet regions are the sole gas outlet regions.

40. The lateral airbag module of claim 39, further comprising a gas bag configured to be inflated by the gas generator, wherein a holding region of the gas flow distributor is arranged within the gas bag.

41. The gas flow distributor of claim 7, wherein the outlet openings of the holder lead into different chambers of the gas bag or into different gas bags.

42. The gas flow distributor of claim 1, wherein the holder includes a fastening device configured to fasten the impact element and the gas generator to a vehicle,
wherein the fastening device includes a cutout region configured to permit gas from the gas generator to pass through the fastening device and impact the impact element.

43. The lateral airbag module of claim 39, wherein the holder includes a fastening device configured to fasten the impact element and the gas generator to a vehicle,
wherein the fastening device includes a cutout region configured to permit gas from the gas generator to pass through the fastening device and impact the impact element.

44. The gas flow distributor of claim 1, wherein the impact element is positioned around an outer circumference of the fastening device.

* * * * *